United States Patent
Gillum

[15] 3,656,015
[45] Apr. 11, 1972

[54] COMBINED LINEAR MOTOR AND CARRIAGE

[72] Inventor: Donald E. Gillum, Goleta, Calif.

[73] Assignee: Information Magnetics Corporation, Goleta, Calif.

[22] Filed: May 4, 1971

[21] Appl. No.: 140,032

[52] U.S. Cl. .................................. 310/13, 310/27
[51] Int. Cl. .................................. H02k 41/02
[58] Field of Search .................. 310/12–14, 27; 179/115.5; 109/148 LM; 318/135, 121

[56] References Cited

UNITED STATES PATENTS

| | | | |
|---|---|---|---|
| 2,820,161 | 1/1958 | Lewis | 310/27 |
| 2,925,503 | 2/1960 | Efromson | 310/27 |
| 3,075,100 | 1/1963 | Efromson | 310/27 |
| 3,505,544 | 4/1970 | Helms | 310/13 |
| 3,577,023 | 5/1971 | Bleiman | 310/13 |

*Primary Examiner*—D. F. Duggan
*Attorney*—Harry W. Brelsford

[57] ABSTRACT

A linear electric motor has a carriage mounted on the side of the motor for motion parallel to the armature axis and the side of the motor is slotted to accommodate a mechanical connection so that the carriage supports the armature. Torque on the carriage is minimized by axially slicing away an axially parallel part of the normally round motor to locate the carriage ways as close to the motor armature axis as is commercially practicable. The load and the servo feedback transducers are mounted on the carriage at the node point of deflection of the carriage caused by armature torque.

5 Claims, 4 Drawing Figures

Patented April 11, 1972

INVENTOR.
DONALD E. GILLUM
BY H.W. Brelsford
ATTORNEY.

INVENTOR.
DONALD E. GILLUM
BY H. W. Brelsford
ATTORNEY.

COMBINED LINEAR MOTOR AND CARRIAGE

DESCRIPTION

This invention relates to linear electric motors and has particular reference to a linear motor combined with a carriage supported on ways physically attached to the side of the motor.

While linear electric motors have many uses in industry, the present invention will be described with reference to a linear motor and carriage for use on computer peripheral equipment for moving read-write transducers over the surface of moving data media such as discs, drums or tapes. Such use of linear motors calls for extremely high precision of movement, and the present invention accomplishes this desired standard of accuracy.

Linear motors differ from rotating electric motors in that the armature is frequently supported by structure outside of the motor frame. For example, most rotating armatures are supported by bearings in the end bells of the frame that supports the field windings. Similarly, reciprocating rods can be mounted in the end bells of linear motors to support the armature coil as it reciprocates back and forth according to the direction of the driving current. High precision work, however, usually requires that the coil be mounted on a carriage external to the mounting frame. For example, a widely used computer motor is open at one end, and the helix of the armature is supported by a matching cylindrical tube that projects into the open end of the motor. The coil is adhered to the end of the tube, and the tube is mounted on a carriage that moves back and forth under the influence of the motor coil. The equipment to be moved is mounted on the carriage. The carriage moves on accurately ground ways, so that the equipment (read-write transducers) secured to the carriage is moved with great accuracy.

The static position control of a linear motor is easily attained, but dynamic control is difficult because of feedback response and mechanical oscillations.

The attainment of dynamic accuracy of carriage movement has heretofore dictated the design parameters of the motor-carriage relationship. It has been generally believed that the dynamic accuracy necessary for movement of read-write transducers along an exact axis required that the carriage be coaxial with the linear motor and that the mounting for the transducers (frequently termed "heads") also be coaxial. It has been generally believed that the non-coaxial transfer of motion from the armature coil would result in torques and moments that would so distort the carriage and its components that the requisite accuracy could not be achieved.

I have discovered a design of motor and carriage that permits the non-coaxial transfer of force from the motor armature coil to the carriage. I have further discovered a design of combined motor and carriage ways that permits the carriage to be mounted on one side of the motor for parallel movement. I achieve this design by slicing off part of the motor to place the carriage ways as close to the motor axis as possible, and then determining the node point of the carriage under the influence of the torque due to the side-mounted armature, and securing the transducer or head mounting blocks at this node point.

Various objects, advantages and features of the invention will be apparent in the following description and claims, considered together with the drawings forming an integral part of this specification, in which FIG. 1 is an elevation view from the carriage side of a presently preferred embodiment of my combined motor and carriage.

Figure 2:
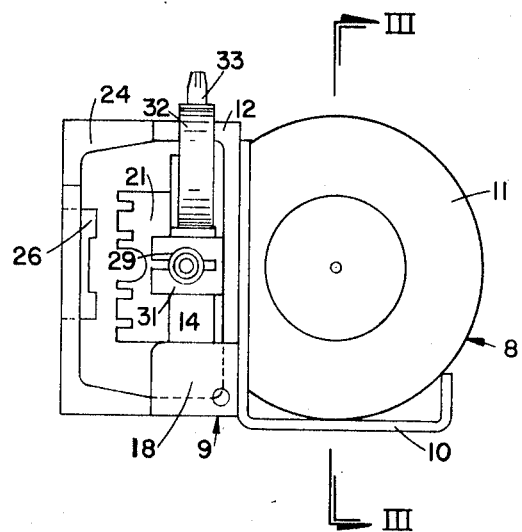
FIG. 2 is an end view from the right-hand end of the motor of FIG. 2.

Referring first to FIG. 2, there is illustrated a linear electric motor 8 including a J-shaped mounting and housing member 10, and a carriage assembly 9 is secured to the side of the motor at the J-shaped part.

Figure 1:
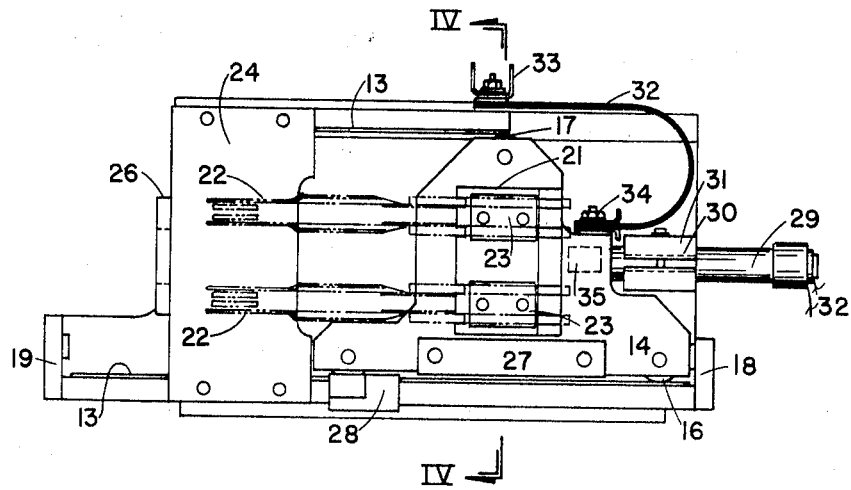

Referring now to FIGS. 1 and 2, the member 10 supports not only the motor 8, but also the carriage assembly 9. It supports the motor housing and forms a part of it, and included in this motor housing is an end cap 11. Secured to the outer side of the J-shaped member 10 is a channel 12 which holds ways 13 upon which a carriage 14 rides upon lower wheels 16 and a single upper wheel 17. The carriage is prevented from running off the ways to the right, as viewed in FIG. 1, by a stop plate 18 and on the opposite end plate 19 retains the carriage mechanism. Mounted on the carriage 14 is a head mounting block 21 to which may be secured read-write transducers 22 which are secured to the mounting block 21 by means of clamp plates 23.

Secured to the outside of the ways channel 12 is a short segment of channel 24 which supports a camming block 26 of nylon or other low friction material, and the purpose of the camming block 26 is to engage the transducers 22 so that they will be spread apart in the unloaded node and released to fly over the upper and lower surfaces of a data disc (not shown) as the carriage 14 moves these transducers to the left in FIG. 1 toward the data discs. The carriage 14 must position the transducers 22 on one of several hundred concentric tracks on the data discs, and the exact location of each track is determined by means of a position transducer of well-known design, including a rack member 27 secured to the carriage and a stationary pick-up member 28 secured to the ways channel 12. The rate of movement of the carriage 14 from one operating position to another is sensed by means of a velocity tachometer or transducer which includes a stationary tube 29 clamped to the ways channel 12 by a split block 31. A permanent magnet 30 in the shape of a bar traverses the interior of this tube 29 and the output therefrom appears in conductors 32 which are connected to a control circuit for the motor. The bar magnet 30 is mounted on the carriage by a split block 35 shown in broken outline in FIG. 1. Electrical current is passed to the interior of the motor by means of a pair of flexible conductors 32 having a stationary terminal 33 at the top of the ways channel 12 and a moveable terminal 34 on the carriage 14.

Figures 3, 4:
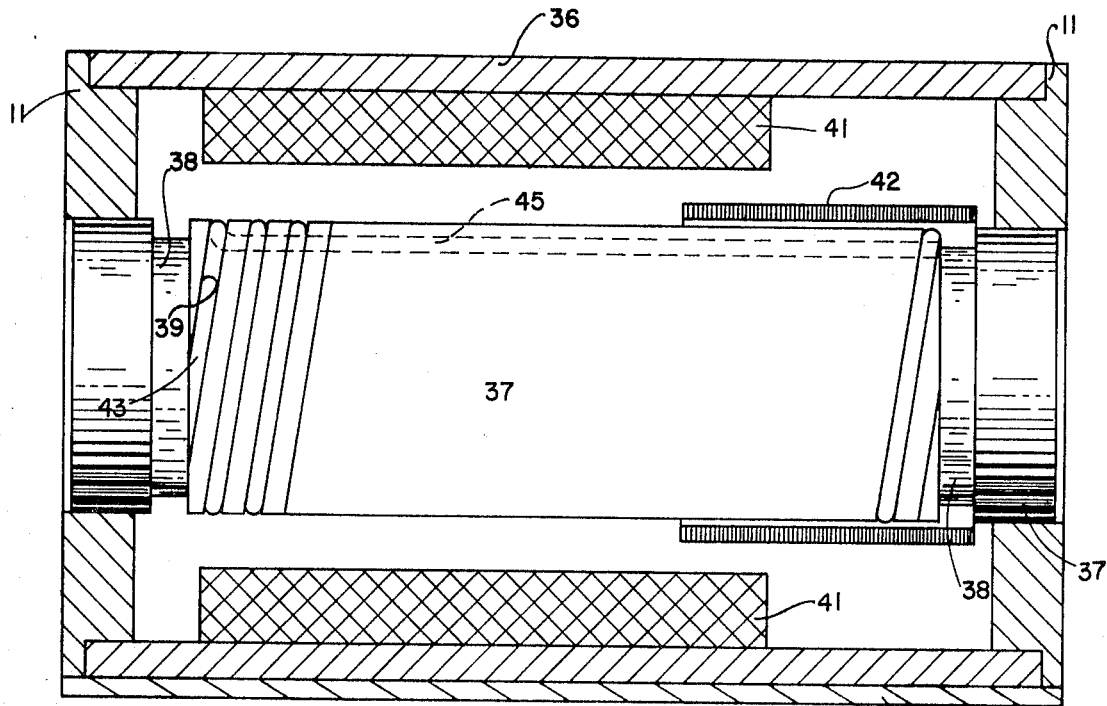
FIG. 3 is a sectional view along the line III—III of FIG. 2.
FIG. 4 is a sectional view along the line IV—IV of FIG. 1.

Referring now to FIGS. 3 and 4, the J-shaped support member 10 has welded thereto a segment of a tubular cylinder 36 which, together with the end caps 11 constitute the housing for the electric motor. Positioned in the end caps 11 is a cylindrical core 37 having a machining relief 38 near each end and helical or thread-like grooves 39 are cut in this core. The core, the end plates 11, the cylindrical segment 36, and the J-shaped member 10 are all formed of magnetic material such as iron or soft steel.

Disposed within the cylindrical shell 36 are axially extending cylindrical segments of permanent magnet 41. These segments are all radially polarized so that the entire interior of the magnetic surface is of one polarity and the exterior of the magnetic surface in contact with the cylindrical shell 36 is of an opposite polarity. This radial polarization of linear motor magnets is disclosed in my co-pending application, Ser. No. 883,179 filed Dec. 8, 1969. A working air gap is established between the interior surface of the magnet sections 41 and the core 37. Disposed within this working air gap is a helical coil 42 of conductor material, such as copper or aluminum, and this coil 42 reciprocates back and forth along the length of the core 37, depending upon the currents passed through the coil.

To protect the magnetic circuit and to prevent distortion of the magnetic field in the working air gap, compensation windings are provided, and these may be in the form of bare wire 43 laid in the helical grooves 39 in the core 37. A lengthwise slot 44 may be formed in the core 37 and this is twice as deep as the helical grooves 39 so that a return conductor 45 may be laid therein to connect one end of the coil to the other. If it is desired to have a multiple series of shorted turns instead of shorting the entire coil as a unit, each turn of the wire 43 may be soldered or welded to this lengthwise conductor segment 45. The use of shorted turn compensation, as contrasted, for example, to series windings with the armature, permits the use of bare uninsulated wire in direct contact with the iron of the core 37.

Referring now to FIG. 4, there is illustrated the construction of the carriage and the carriage ways. Each web of the channel 12 has a groove 46 cut therein in which is held an accurately ground round bar 47. These bars 47 act as the rails upon which the lower carriage wheels 16 and the upper carriage wheel 17 ride. The carriage body is formed from an integral web structure which includes an outer face 50 with webbing ribs 48 projecting toward the motor. The most important webbing consists of a border web around the triangular outline of the carriage and the axes of these webs, if extended, would pass through the wheel axes. The wheels 16 are mounted in conventional fashion to the carriage, but the upper wheel 17 is preferably mounted on an elastic shaft mounted on an eccentric bushing 49 which may be rotated to move the axis of the upper wheel 17 toward or away from the axes of the bottom wheels to provide a tight fit of the wheels against their respective rails or ways 47. The wheels 16 and 17 are mounted on pretensioned bearings so as to avoid any non-elastic movement of the wheels along the axis of rotation and to insure that the wheels will not be elastically bent when subjected to forces within design limits. Covering the motor side of the carriage is a thin plate 60 to form with webbing 48 a box structure that resists distortion. The space between the webs is filled with plastic foam 55 to further stiffen the carriage and damp out vibrations.

The armature 42 is supported by the carriage by means of a two-piece block interconnecting the two. Referring especially to FIG. 4, this block extends through a pair of slots 51, cut in the J-shaped frame member 10 and the carriage channel 12. Secured to the outside of the armature 42 by epoxy or other nonconductor connection is a block 52 of nonconductor material such as plastic, and this extends into the slots 51. Connected to the outer end of the block or stub 52 is a T-block 53 and screws 54 or other suitable fasteners may secure the T-block to the armature block 52. The T-block 53, in turn, is secured to the carriage by suitable fasteners such as screws 56. Electrical conductors for the armature 42 may extend through the same slots 51 and may be either physically connected to the block 52 or may separately project from the armature 42. These, in turn, are connected to the carriage electrical terminal 34 (FIG. 1).

The assembly of the motor and carriage may best be explained with reference to FIGS. 3 and 4. The J-shaped member 10 is welded at several points to the cylindrical shell 36 and the magnets 41 are next adhered to the interior of the shell 36 by epoxy or any suitable fasteners. The armature 42 with its projecting stub 52 are next placed inside of the magnets 41 and the core 37 is next inserted inside of the armature. The end caps 11 are then put in place, thereby securing the motor parts together. The end caps or plates 11 are preferably press fitted to both the outer shell 36 and the core 37 to get good magnetic connections between these parts. The carriage assembly 9 is next secured to the J-shaped member 10 and the carriage 14 is moved to one end or the other while the T-block 53 is secured to the armature projecting stub 52. Thereafter, the carriage is moved to a proper location so that the screws 56 may secure the T-block 53 to the carriage, at which point the carriage supports the armature 42 in spaced relationship to both the core 37 and the magnets 41.

The mounting block 21 is positioned on the carriage particularly in accordance with the invention. The precise location of the mounting block 21 on the carriage is determined experimentally after loading the T-block with its transducers or heads 22 (FIG. 1) and securing plates 21. The node point of deflection of the carriage about a vertical axis is next determined experimentally, and the position of the block 21 is then permanently fixed at the point where the node is located. This vertical node axis differs from one construction to another, and in the particular mechanical structure illustrated the node axis was just slightly to the left of the wheel axis of the top wheel 17 as viewed in FIG. 1. If the block 21 is located off the node a substantial distance, then the displacement of the transducer heads 22 is excessive.

The moveable bar 30 (FIG. 1) of the tachometer which includes the tubular coil 29 is also mounted particularly in accordance with the invention. I have found that mounting the bar magnet 30 with respect to a vertical node axis of the carriage as viewed in FIG. 2 results in accurate readings of the tachometer. This is in contrast to attempts to place the bar magnet 30 outboard of the node axis wherein fore movements of the carriage actually resulted in aft movement indications from the tachometer. Inasmuch as the control of the linear motion of the motor must be regulated to micro inches, this precise control by the tachometer, combined with the position counter 27–28 is vital to the correct functioning of the combined motor and carriage. I have discovered with respect to FIG. 2 that the vertical axis for the node of flexure of the carriage under the influence of the torque transmitted by the armature is almost through the grooves of the wheels 17 and 16 (see FIG. 4) for this particular mechanical construction. As viewed in FIG. 2, therefore, the center axis of the tachometer coil 29 is located on this vertical flexure node axis.

The forces acting on the carriage to deflect it are best described with reference to FIG. 4. There it will be noted that the center of force of the armature 42 is in the center of its circular shape, and this force acts through a moment arm or torque arm that extends from that center point to a vertical axis passing through the grooves of the wheels 17 and 16. This torque therefore tends to elastically deform the carriage 14, especially during high acceleration. The resultant flexure node is an axis just to the left of that passing through the wheel grooves, and this therefore is the axis chosen for mounting the center of the permanent magnet bar 30 (FIG. 1).

Referring still to FIG. 4, the construction of the motor which permits a minimum torque arm or moment arm is readily apparent. There it will be noted that the generally circular shell 36 for the motor in effect has a cord section formed by the vertical portion of the J-shape. The channel 12 which holds the ways 47 for the carriage is secured to this cord portion of member 10 and thereby disposes the carriage as close as practicable to the center of the coil 42. This is made possible by eliminating approximately one-fourth of the circular extent of the permanent magnets 41 that form the field for the motor. It would, of course, be a shorter arm if the entire motor were cut in two at the center of the core and the carriage ways disposed on the core. This, however, is not practical from a commercial standpoint, and the illustrated three-quarters extent of the magnets is believed to be the most practical commercial compromise for shortening the moment arm on the carriage. In effect, therefore, I have sliced away a portion of a round cylindrical linear motor in order to place the carriage as close as practical to the center of force of the armature. The mounting block 21 on the outboard side of the carriage supports the load for the entire carriage, namely the transducers 22 shown in FIG. 1. The transducers, of course, have very minute electrical currents flowing through them, and by making the J-shaped member 10 of magnetic material, the radial magnetic field is cut off at the region of the carriage ways channel 12 so that magnetic forces will not induce any currents in the conductors of the transducers, nor interfere with those currents. For this purpose the member 10 extends the full length of the motor. The member 10 therefore not only serves as a magnetic shield for the carriage, but acts as a mounting plate for the carriage and the horizontal portion acts as a mounting plate for the combined motor and carriage. The combined motor carriage is much easier for the customer to install in his disc drives because a single mounting is all that is required, compared to the two separate mountings when the motor and the carriage are separately supplied, as is conventional in the industry. The end plates 11 on the motor (FIG. 3) prevent any flux from leaking out the ends of the motor to thereby prevent interference with the transducers.

The combined motor carriage of the invention permits a very short unit and enables the motor to be placed within less than an inch of the edge of the discs. In actual practice, the data discs actually project over the left end of the carriage, as illustrated in FIG. 1, and this proximity is possible only because of the almost complete shielding of the motor structure itself which contains the field flux and does not let it interfere with transducers, nor with the recorded bits on the rotating discs.

I have described the presently preferred embodiment of my invention, as required by the Rules. It will be obvious to those skilled in the art, however, that various modifications and variations can be made therein. The accompanying claims, therefore, cover all such modifications and variations that fall within the true spirit and scope of the invention.

I claim:

1. A linear motor and side mounted outboard carriage combination comprising:
   a. a motor shell of magnetic material having a motion axis;
   b. an armature reciprocable along said axis for a stroke distance;
   c. an axially elongated opening in one side of said motor shell having a length to accommodate said armature stroke distance;
   d. carriage ways secured immediately adjacent to the exterior of the motor shell at the region of said opening;
   e. a carriage mounted on said ways and supporting said armature through said opening;
   f. and means for supplying current to said armature, whereby said armature reciprocates within the motor shell and moves said carriage.

2. A linear motor and carriage combination as set forth in claim 1, wherein the carriage has a load support means located at the node point of flexure of the carriage under the influence of the moments transmitted by the armature.

3. A linear motor and carriage combination as set forth in claim 1, wherein the carriage supports a moveable element of a velocity tachometer and the motor frame supports a stationary element of a velocity tachometer, and the mounting location on the carriage for the moveable element is located at a flexure node.

4. A linear motor and side mounted carriage combination comprising:
   a. a generally cylindrical core of magnetic material;
   b. field magnets in the form of an axial segment of a cylindrical tube spaced from said core to define a working air gap and having an axial section devoid of magnets;
   c. a shell of magnetic material surrounding said magnets;
   d. at least one low reluctance magnetic path connecting the shell and the core;
   e. a cord section formed on the magnetic shell in said magnet-absent region of the motor and having an axially extending slot;
   f. carriage ways mounted on said shell;
   g. a carriage mounted on said ways for reciprocation close to said opening;
   h. an armature extending around the core and mechanically connected to the carriage through said slot;
   i. and means for supplying current to said armature to cause it to reciprocate within said working air gap and thereby move said carriage.

5. A linear motor as set forth in claim 4 wherein the means for supplying current to the armature includes conductors extending through said slot.

* * * * *